United States Patent [19]

Dunfield et al.

[11] Patent Number: 5,578,882
[45] Date of Patent: Nov. 26, 1996

[54] PASSIVE MAGNETIC BEARINGS FOR A SPINDLE MOTOR

[75] Inventors: John C. Dunfield; Kamran Oveyssi; Gunter K. Heine, all of Aptos, Calif.

[73] Assignee: SeagateTechnology, Inc., Scotts Valley, Calif.

[21] Appl. No.: 460,648

[22] Filed: Jun. 2, 1995

Related U.S. Application Data

[62] Division of Ser. No. 201,676, Feb. 25, 1994, Pat. No. 5,541,460.

[51] Int. Cl.⁶ .......................... F16C 39/06; H02K 21/14
[52] U.S. Cl. .......................................................... 310/90.5
[58] Field of Search ................................. 310/67 R, 90, 310/90.5, 268, 51; 360/98.07, 99.09, 99.08; 384/110, 61, 907.1, 913, 246

[56] References Cited

U.S. PATENT DOCUMENTS

| | | | |
|---|---|---|---|
| 2,203,411 | 6/1940 | Green | 384/246 |
| 3,243,238 | 3/1966 | Lyman | 310/90.5 |
| 3,934,950 | 1/1976 | Kuhlmann | 310/90.5 |
| 4,211,452 | 7/1980 | Poubeau | 310/90.5 |
| 5,043,615 | 8/1991 | Oshima | 310/90.5 |
| 5,126,610 | 6/1992 | Fremerey | 310/90.5 |
| 5,182,533 | 1/1993 | Ritts | 310/90.5 X |
| 5,391,952 | 2/1995 | Simazu | 310/67 R |

OTHER PUBLICATIONS

"Precision Magnetic Bearing Systems" D. K. Rao, Tech. Bulletin No. C–1022, Jun. 1993.

*Primary Examiner*—Mark O. Budd
*Attorney, Agent, or Firm*—Flehr, Hohbach, Test, Albritton & Herbert

[57] ABSTRACT

An apparatus for rotatably journaling a rotor of a spindle motor about a shaft comprising a plurality of annular ring multi-pole magnets, each ring comprised of a plurality of axially aligned magnets whose polarity is alternated along the radius of the ring. The annular ring multi-pole magnets are disposed on both the rotor and stator of a spindle motor in opposition in attraction mode, or a complete offset repulsion mode with like poles facing one another with an full offset, thereby forming a radially stable magnetic bearing for maintaining rotor displacement about a shaft in conjunction with a conventional axial pivot.

11 Claims, 9 Drawing Sheets

PASSIVE MAGNETIC BEARINGS FOR A SPINDLE MOTOR

This is a division of application Ser. No. 08/201,676 filed Feb. 25, 1994 now U.S. Pat. No. 5,541,460.

The present invention relates generally to disc drive systems and particularly to an apparatus for rotatably journaling a rotor of a spindle motor about a stator wherein a plurality of annular ring multi-pole magnets are disposed on both the rotor and stator in opposition thereby forming magnetic bearings for maintaining rotor displacement about the stator in conjunction with a conventional pivot. The present invention provides for the unique combination of magnetic bearings with other conventional pivots for use in disc drive systems.

BACKGROUND OF THE INVENTION

The present invention provides an improvement to the basic disc drive spindle motor in which ball bearings are utilized to journal a rotor about a shaft in a spindle motor. The embodiments of the present invention are designed to implement a magnetic bearing in a disc drive providing for a unique application of the known technology to improve disc drive motor performance.

Conventional mechanical bearings used in conjunction with high rotational speed devices are subject to metal wear, vibration/shock and friction problems. Metal wear occurs when the metal to metal contact surfaces of the conventional ball bearings rub against the interior or exterior races (or against the rotating body in a raceless bearing) of the ball bearing assemblies. Conventional bearing systems provide lubricants to minimize the wear due to surface abrasions. However, at start up, when the lubricants have tended to settle, discernable metal to metal contacts will arise, and over life wear will result for bi-directional or uni-directional motion. While lubricants help to alleviate some of the wear problems, their introduction into the contamination sensitive disc drive environment poses a second problem, namely out-gassing and particulate contamination. In a disc drive, particulate contamination must be minimized due to potential damage and distortion of read write transducers which fly at small gaps on the order of 2.5 micro inches above the disc surface. As data densities increase lower "fly" heights will result thereby magnifying the problem. Additionally, as particulate contamination increases, data may be incorrectly written or irretrievable, thereby dramatically affecting system integrity and performance. Thus in conventional mechanical bearing systems, conventional means for minimizing metal wear give rise to other delirious effects.

Vibration and shock problems arise in two particular contexts. First, disc drives are designed to be resistant to levels of shock to allow for the handling of the disc drive itself as well as the particular use of the disc drive in the given working environment. Particularly the removable and portable disc drive systems must be designed so as to accommodate for everyday knocks and shocks without disc system failure. The conventional bearing systems used in disc drives must be able to sustain these everyday shocks while maintaining system integrity. Because of the surface-to-surface contact and surface stress between the balls and races found in a conventional bearing system, the aforementioned everyday shocks will often result in abrasions or deformities to the ball bearing surfaces, the effects of which will be discussed below in conjunction with the friction problem.

Secondly, recognizing the shock requirements that the disc system must perform under, another shock related problem arises, namely shock testing. During the qualification phase of production, each disc drive is subjected to a shock test in order to assure that each disc drive will be able to withstand the rigors of the operating and non-operating environment described above. Shock loads result in high surface stress between the contacting surfaces which can exceed the elastic deformation of the individual materials causing additional wear, ultimately leading to bearing failure.

The third problem found in the use of mechanical bearing systems is interrelated and directly attributable to metal wear and surface quality because of the high precision of machined bearing components, namely friction. Friction is a measure of the resistance to motion of the ball bearing, and must be overcome by the motor in order to begin or maintain the ball bearing in motion. Therefore, extra motor power must be allotted to compensate for the effects of friction and also budgeted for increases in friction over the life of the mechanical bearing system. Friction in a conventional ball bearing has many components and is attributable in part to the ideal (initial) roundness of the ball bearing used, the viscosity of the lubricant selected, and the amount and severity of surface irregularities developed over life. As metal wear and other surface irregularities arise, the normally smooth surface of the ball bearing and raceways becomes pitted and scratched resulting in an increased frictional force which opposes motion of the bearing dramatically at start up (a motor torque problem) and also during normal operation. Any frictional forces will result in an inherently inefficient use of motor power, and may ultimately result in the failure of the bearing system, the spindle motor or other disc drive systems.

Another problem arises from the use of conventional bearing systems, acoustic noise. Conventional bearing systems are inherently noisy, and as surface irregularities develop in conventional ball bearings the acoustic noise generated by the spinning bearings is both clearly audible and potentially bothersome to the average consumer. The computer disc drive industry has moved away from the whirling noisy early disc drive offerings, and now is very conscious of any acoustic noise sources. As such, any improvement over an inherently noisy conventional ball bearing system is desirable for hard disc drive applications.

Another problem found with the use of conventional bearing systems is the vibrations the rolling bearing systems induce in the disc drive assembly. As the ball bearings rotate, vibrations and inaudible noise will be induced at varying frequencies due to the dynamics of the movement and geometric shape of the bearing components of the ball bearing system. As surface damage induced irregularities arise, bearing defect frequencies may appear, and the level of noise and/or vibration may increase. Disc drive designers are aware of the deleterious effects of such noise sources and design around such frequencies, often employing filters or other dampening means which are both costly and space prohibitive. Bearing systems which would not "age", which could be characterized specifically at design inception would allow for better and more efficient disc drive design solutions.

Finally, in a disc drive, the mechanical bearings must perform consistently over their rated life, any failure resulting in failure of the entire system. Performance of the mechanical bearings in a disc drive may be measured by various parameters including wear and losses (due to friction) as described above, as well as other disc positioning performance parameters such as radial and axial stiffness, susceptibility to repeated shock and to non-repeatable run-out.

Disc positioning parameters refer to the ability of the disc drive spindle motor to rotate a given disc consistently in a given plane while maintaining the spatial relationship of the disc with respect to the remaining disc system components. Stiffness in either the radial or axial direction is a measure of the bearing system's (or pivot's) ability to maintain the relationship of the spinning disc with the remaining disc drive components. Axial stiffness in a axially aligned spindle motor provides for resistance to compression or tilt of the fixed disc about the bearing system due to external axial shocks. The higher the axial stiffness, the less likely tilt will occur, and accordingly, less likely that the read/write heads will come into contact with the spinning disc upon the introduction of an external axial shock. Radial stiffness in an axially aligned spindle motor provides for resistance to radial movement of the spinning disc toward or away from the shaft as radial forces are exerted on the disc drive. The higher the radial stiffness, the less likely that disc positioning errors will occur. This is particularly important in the higher density disk drives of today, where with the increased track densities on the order of 5 micro-inches, even the smallest deviation of disc radial location will result in data errors. Because of the contact-contact configuration of conventional bearing systems, directional stiffness is easily achievable in systems employing conventional bearings. As such the use of mechanical bearings and pivots provides a high degree directional stiffness performance.

Non-repeatable run-out particularly is a performance measure of the disc drive spindle motor's ability to place the magnetic heads over an identical spot on the spinning disc consistently over time. Deviations in the location of the read/write heads with respect to the spinning disc will yield data losses and/or irretrievable data. As such a spinning disc, and particularly a bearing system for journaling a disc about a rotating shaft, must consistently perform over life, repeatedly positioning the read/write heads with respect to the spinning media. Conventional bearing systems degrade over life, necessarily resulting in poorer non-repeatable run-out performance of the bearing systems.

Magnetic bearings are well known. Particularly, the use of magnetic bearings in motors has heretobefore been known. Magnetic bearings provide a low friction means of journaling components, however they also provide only limited directional stiffness and stability. Significantly, the stiffness provided by a conventional bearing system is at least two orders of magnitude greater than a magnetic bearing of the same overall size. In order to achieve comparable directional stiffness performance, a magnetic bearing system would occupy a significantly larger area, or require active field-intensifying components, the sum of which would deleteriously affect overall disc drive system size, cost and performance. Accordingly, magnetic bearings were heretobefore unknown in the disc drive industry where cost, component size and bearing system stiffness were of paramount concern. Notably, a passive magnetic suspension system, one in which no active feedback measures are employed, is now particularly attractive because of improved magnet energy to cost ratios, the subject matter of which is exploited in the present application.

SUMMARY OF THE INVENTION

It is the object of the present invention to provide an apparatus for rotatably journaling a rotor of a spindle motor about a shaft by means of a magnetic bearing assembly.

It is another object of the present invention to provide a radially or axially stable bearing assembly for use in a disc drive motor.

It is another object of the present invention to provide a bearing assembly for use in a disc drive that is not susceptible to wear or damage from repeated shocks.

It is a further object of the present invention to provide a bearing assembly for use in a disc drive which minimizes the particulate contamination introduced into the sealed disc drive environment.

It is a further object of the present invention to provide a balanced bearing assembly for use in a disc drive which has minimal losses and a substantially improved non-repeatable run out characteristic as compared to prior an ball bearing systems.

It is a further object of the present invention to provide a magnetic bearing system for use in a disc drive in which physical size is optimized while providing sufficient directional stiffness.

It is a further object of the present invention to provide a low noise bearing system for minimizing the audible acoustic noise attributable to the operation of the bearing system.

It is a further object of the present invention to provide a bearing assembly for use in a disc drive which has minimal and stable vibration generation characteristics as compared to prior art ball bearing systems.

It is a further object of the present invention to provide a magnetic bearing for use in combination with a hydrodynamic bearing thereby providing the equivalent directional stiffness to a conventional ball bearing system.

Finally, it is an object of the present invention to minimize the friction in the bearing assemblies of disc drive motors thereby extending bearing life and maximizing the mean time before failure for the bearing assembly.

In accordance with these and other objects of the invention, an apparatus is provided comprising a plurality of annular ring multi-pole magnets, each ring comprised of a plurality of axially aligned magnets whose polarity is alternated along the radius of the ring. The annular ring multi-pole magnets are disposed on both the rotor and stator in attraction mode with opposite poles facing one another, either in opposition or with a complete offset thereby forming a stable magnetic bearing for maintaining rotor displacement about the stator in conjunction with a conventional pivot.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
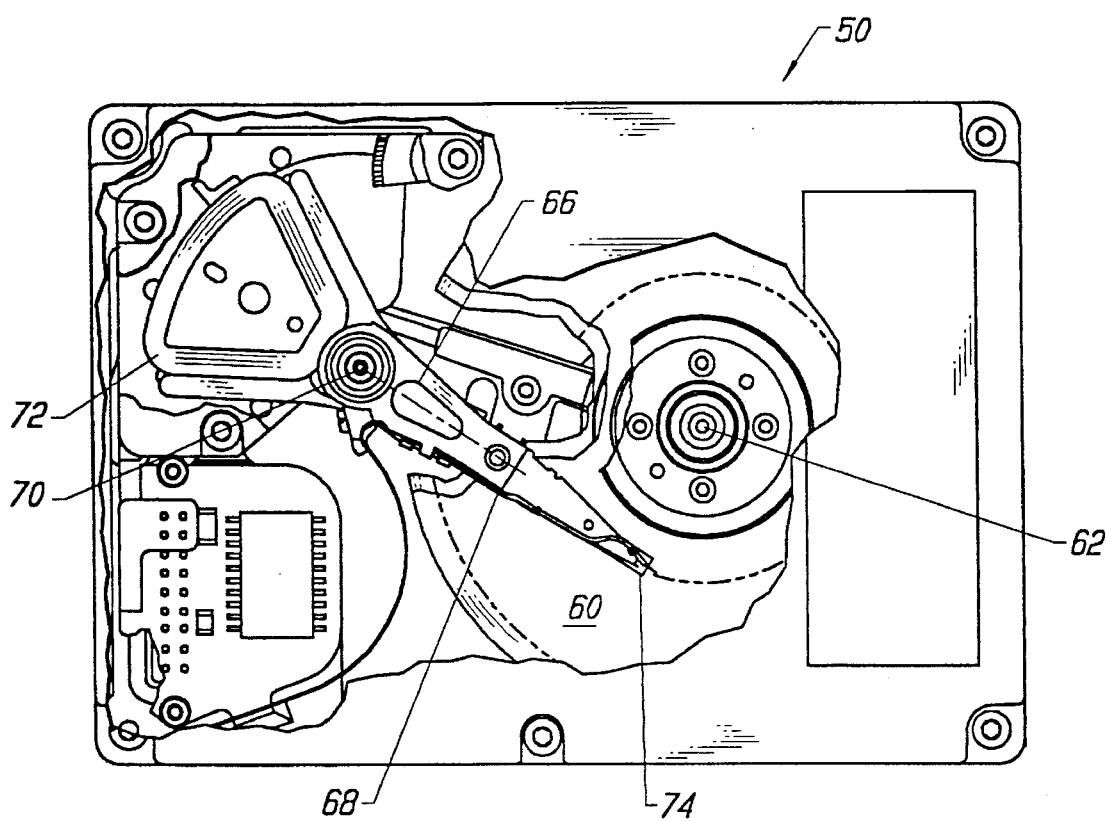
FIG. 1 is a plan view of a disc drive incorporating the first embodiment of the present invention.

Referring to FIG. 1, there is shown an cut-away view of an entire disc drive assembly 50 incorporating the preferred embodiment. A disc 60 is journaled about a shaft 62 which is in turn rotated by a spindle motor 64 (not shown). An actuator arm assembly 66 includes a substantially triangular shaped actuator arm 68 having a pivot point 70 around which the arm 68 rotates. A motor assembly 72 is attached to one end of arm 68 to provide the force required to pivot the arm 68 about the pivot point 70. Located at the other end of arm 68 is a read/write head assembly 74. In combination, the motor assembly 72 provides the force to rotate arm 68 about pivot 70 so as to position the read/write head assembly 74 adjacent to a specified position on the disc 60. The disc 60 is rotated such that the read/write heads fly over the surface of the disc 60 able to read or write data to and from the disc surface.

Figure 2:
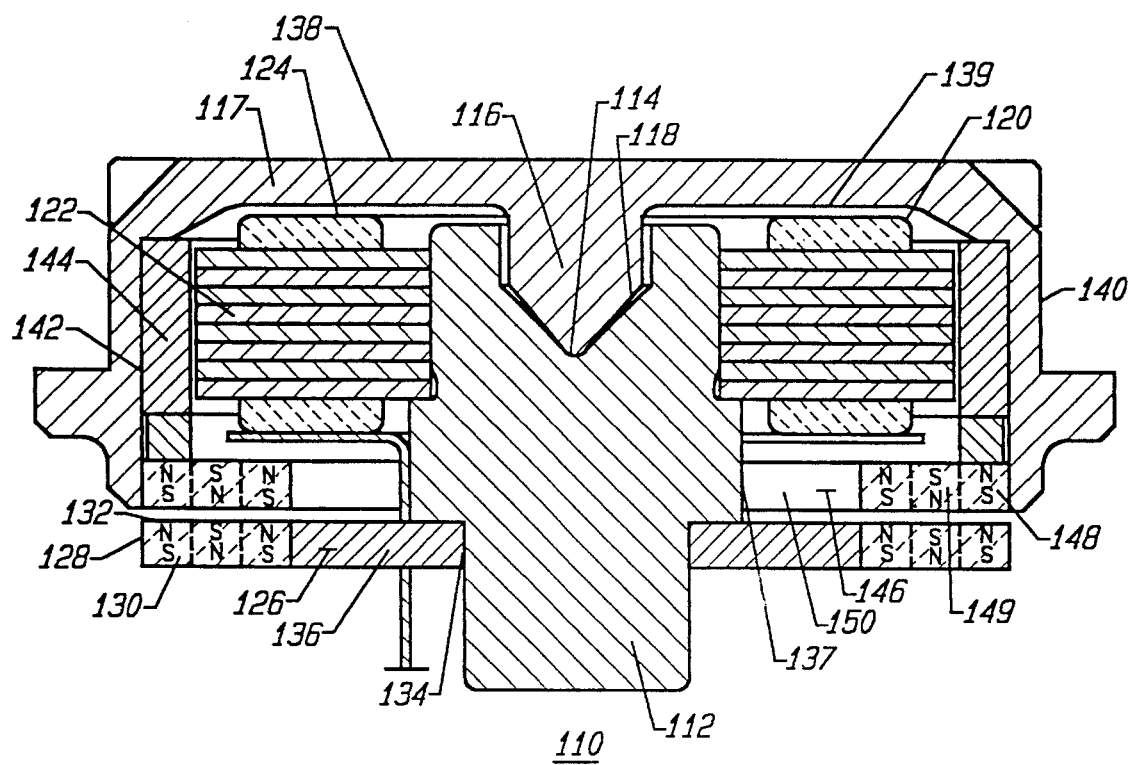
FIG. 2 is a cut away view of a disc drive spindle motor incorporating the first embodiment of the present invention.
Figure 3A:
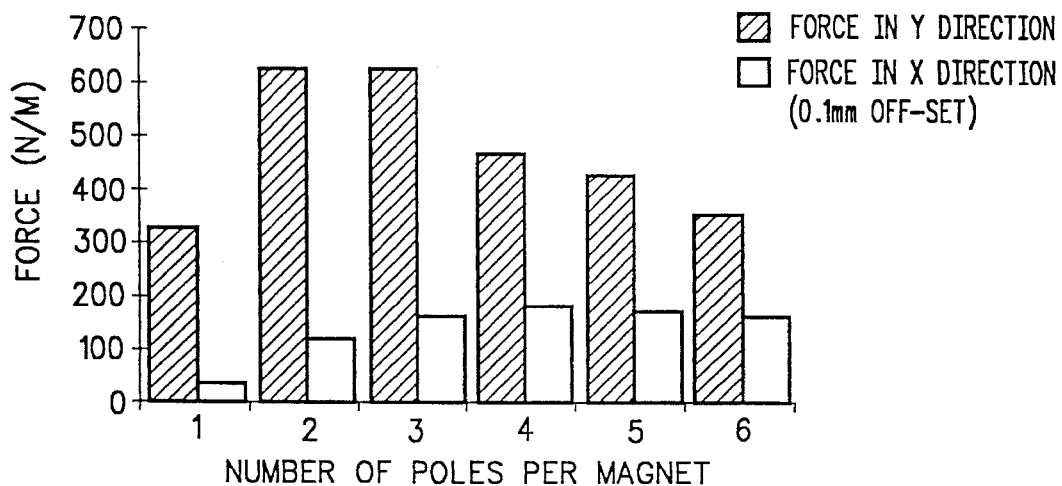
FIGS. 3A–3G shows flux plots of multi-pole magnetic bearing configurations for use in the present invention having one to six poles and includes a summary graph depicting the resultant forces in both the x and y direction for each configuration.
Figure 3B:
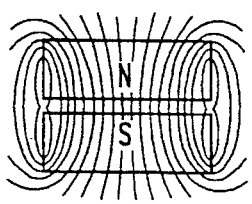
Figure 3C:
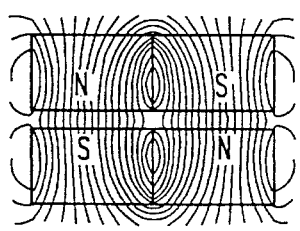
Figure 3D:
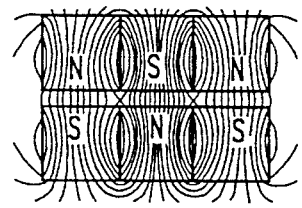
Figure 3E:
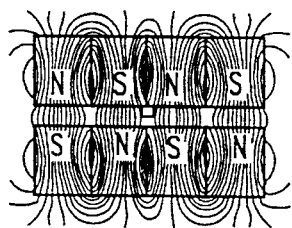
Figure 3F:
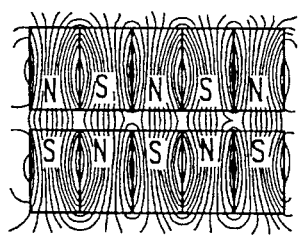
Figure 3G:
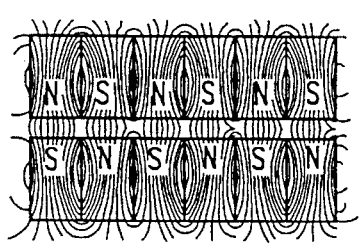

Referring to FIG. 2, there is shown an cut-away view of a spindle motor assembly 110 adapted for use in a disc drive and incorporating a first embodiment of the present invention. A spindle motor assembly 110 includes a stator 112 having an axial pivot 114 around which a hub shaft 116 of the rotor 117 rotates. In a first embodiment of the present invention a conventional axial pivot 118 facilitates the pivoting of the hub shaft 116 about the stator 112. Those ordinarily skilled in the art will recognize that a plurality of bearing types may be utilized at the axial pivot 114 including conventional, hydrodynamic, ceramic or ruby ball bearing systems, and as such the disclosure of a conventional ball bearing should in no way be construed as limiting. Additionally, the present invention is equally suited for fixed as well as a rotating shaft system as disclosed in the first embodiment.

Disposed on the fixed stator 112 is a plurality of stator laminations 120, 122 supporting coil windings 124. The motor as shown depicts a laminated stator but it may also be of the ironless or basket weave type with low air gap unbalance force. Below the stator windings 120, an annular disc assembly 126 is disposed on the stator 112 forming the lower portion of the magnetic bearing. The annular disc assembly 126 includes an outer portion extending from its periphery inward formed from a multi-pole magnet ring 128 having a plurality of axially aligned poles 130. Each pole 130 of the multi-pole magnet ring 128 is oriented so as to alternate north and south poles on a top surface 132 of said annular disc assembly 126. No spacers are utilized between the poles, thereby creating a continuous multi-pole magnet ring 128 having alternating axially oriented poles. In a first embodiment, the multi-pole magnet ring 128 consists of three poles, the first of which is oriented with a north pole facing the top surface 132 of the annular disc assembly.

Still referring to FIG. 2, the annular disc assembly 126 also includes a centrally disposed aperture 134 for journaling the disc assembly 126 about the stator 112. In the preferred embodiment of the present invention, between the central aperture 134 and the multi-pole magnet ring 128 lies a non-magnetic spacer ring region 136. The spacer ring 136 may be eliminated or reduced in size to accommodate more poles in the multi-pole magnetic ring 128 as required for any particular application. If eliminated, then some means of restricting the magnetic path through the shaft must be accomplished in order to maintain magnetic circuit integrity.

The rotor 117 is substantially drum shaped with a centrally disposed hub shaft 116 extending from the interior of the drum for engaging with the axial pivot 114. The rotor 117 further comprises a top 138, interior face 139, exterior side 140 and interior wall 142. Disposed on the interior wall 142 is a spindle magnet 144 aligned with stator laminations 122. The spindle magnet 142 comprises an annular disc and includes a plurality of poles which oppose the stator permanent magnets 122 and allow for the movement of the rotor about the stator as the coil windings 124 are alternatively energized. Beneath the spindle magnet 144 and attached to the lower portion of the interior wall 142 about its circumference is a second annular disc assembly 146 which forms the top portion of the magnetic bearing.

The second annular disc comprises a complementary multi-pole magnet ring 148 disposed closest to the interior wall 142 so as to align perfectly over the multi-pole magnet ring 128 which is attached via the annular disc 126 to the stator 112. The complementary multi-pole magnet ring 148 comprises a like plurality of axially aligned poles 149 which are aligned in attraction mode over the top of the opposing poles of the multi-pole magnet ring 128. The second annular disc 146 also includes a spacer region 150 coupled to the complementary multi-pole magnet ring 148 and extending toward the stator 112. In the first embodiment, the spacer region 150 is constructed from non-magnetic materials. Those ordinarily skilled in the art will recognize that the spacer region 150 may be reduced in size, or completely eliminated if more poles are required in a particular application forming a larger magnetic bearing. Additionally, a magnetic permeable spacer region may be provided to act as a flux return thereby increasing the efficiency of the magnetic bearing. Finally, the second annular disc 146 includes a aperture 137 located to the inside of the spacer region 150 so as to allow the rotor 117 to rotate freely about the pivot 114 and around the stator 112. In the first embodiment, the top and bottom portions of the magnetic bearing (annular disc 128 and complementary annular disc 148) are separated by a gap of 0.25 mm.

As the coils of the stator assembly 120 are alternately energized, the interaction of the magnetic fields with the current flow will result in movement of the rotor 117 about the pivot 114. The combination of the annular disc 126 and second annular disc 146 act in concert as a magnetic bearing, and as configured, provide balance, radial stiffness and axial pre-load to the completed assembly. The effect of the complementary magnet pairs in attraction about the entire circumference of the rotor provides a balanced force evenly distributed over the entire rotor, thereby providing axial pre-load and balance. The alternating polarity poles configuration provides the radial stiffness as repulsive forces interact between adjacent complementary poles maintaining their spatial configuration. In this configuration, the complementary discs are resistant to radial shocks as the attraction forces of the interior aligned pair of poles in the multi-pole magnet rings 128 and 148 are at a maximum, augmented by the repulsive forces from the poles of opposite polarity which are adjacent to the complementary pole pair. As described previously, the three pole configuration of the first embodiment maximizes the attraction forces between the complementary poles (for axial balance) while also optimizing the radial forces generated about the circumference yielding radial stiffness.

Referring to FIGS. 3A–3G, flux plots of multi-pole magnetic bearing configurations having one to six poles in an identical sized magnet are provided. The plots were derived from axially aligned grade 32H NdBFe magnets in attraction with a gap of 0.25 mm and measured with a horizontal offset of 0.1 mm from vertical alignment. A fixed stator (Seagate model ST9103) and rotating shaft (ST9190 hub) motor configuration was utilized at a reference speed of 3600 RPM. The analysis results for each configuration are summarized graphically for ease of comparison. One ordinarily skilled in the art will recognize that as the number of poles is increased, a optimum force in the x direction (indicating radial stiffness) is achieved in a 4 pole configuration. Similarly, one ordinarily skilled in the art will recognize that as the number of poles is increased, a optimum force in the y direction (indicating axial stiffness) is achieved in a 3 pole configuration. In the y direction, the forces of attraction of the aligned poles are augmented by the repulsive forces of the pairs of opposite polarity poles located on each side of the complementary aligned poles. However as the number of poles increases, the resultant flux plots show a markedly reduced overall attraction due to flux paths that begin to develop between adjoining poles (on the same disc). In the x direction, the forces increase as pole pairs are added culminating in a maximum force corresponding to a 4 pole configuration. Beyond three poles the forces in the x direction do not significantly increase thereafter, due to the counter acting forces developed between alternating polarity pairs. Accordingly, for this particular geometry and size magnet selected, a three or four pole configuration would result in the optimum stiffness depending on the direction in which the most stiffness is required.

Figure 4:
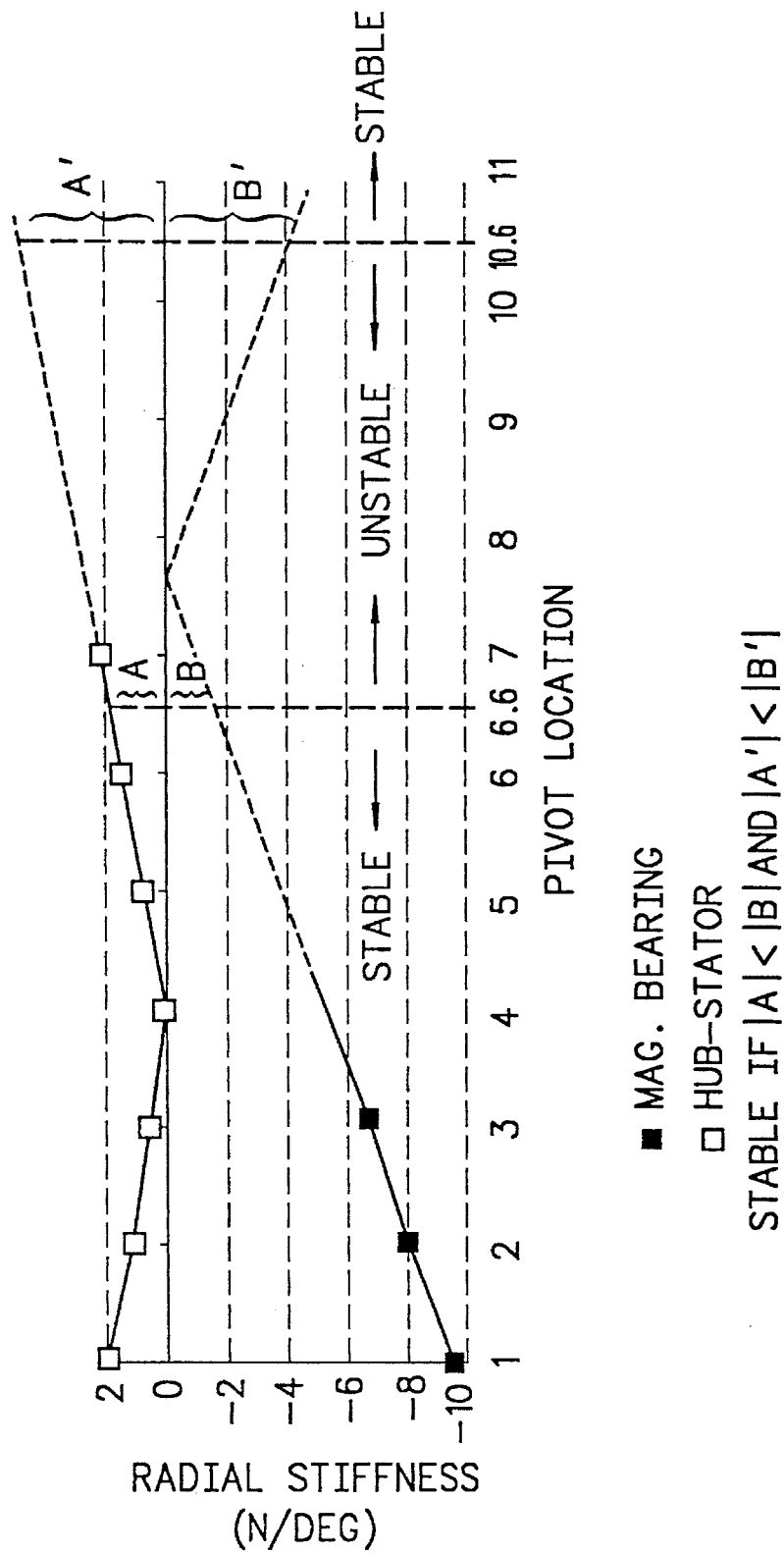
FIG. 4 shows the radial stiffness and stability attributable to various pivot configurations of the first embodiment of the present invention.

In the first embodiment of the present invention, the radial stiffness developed due to the three pole configuration is summarized graphically in FIG. 4 at various pivot locations. One ordinarily skilled in the art would recognize that as compared to conventional ball bearing systems, the radial stiffness developed in the three pole configuration of the preferred embodiment is at least an order of magnitude less than that provided by conventional ball bearing systems. However, the magnetic bearings are lossless, do not generate acoustic noise, are easily characterizable as to vibration frequencies, are not subject to wear or friction problems and perform consistently over life. While some finite minimum amount of radial stiffness (greater than 30,000 N/m) is required to maintain a functional system, a lesser degree of radial stiffness can be compensated for by the servo control and feedback system. Alternatively, radial stiffness can be augmented by the use magnetic bearings in combination with other more radially stable bearing types, specifically hydrodynamic bearing systems.

Figure 5:
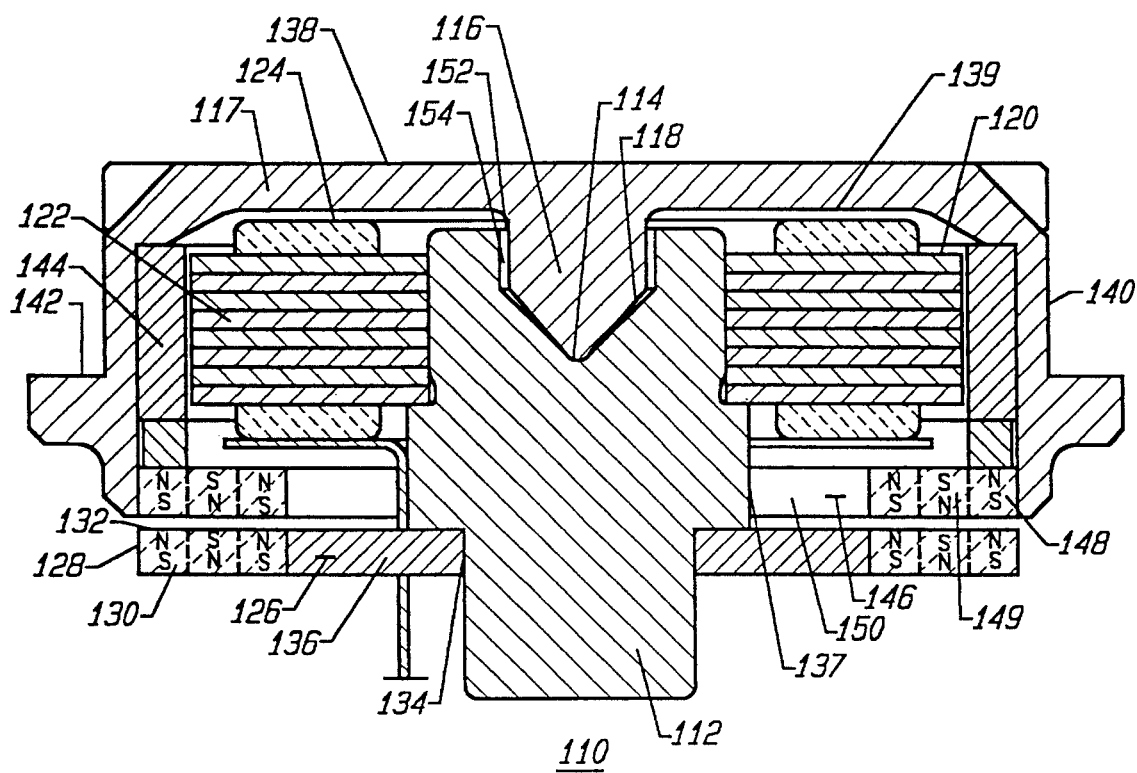
FIG. 5 is a cut away view of a disc drive spindle motor incorporating the first embodiment of the present invention including a hydrodynamic bearing for greater radial stiffness.

Referring now to FIG. 5, the first embodiment of the present invention is shown including a hydrodynamic bearing 152 for increased radial stiffness. In this embodiment a hydrodynamic bearing 152 is utilized at the pivot 114. Those ordinarily skilled in the art, will recognize that while the disc 60 (FIG. 1) is in motion, fluid (or air) utilized in the hydrodynamic bearing will fill the space between the hub shaft 116 and the stator well 154 thereby forming a fluid (or air) reservoir. As the pressure develops in the bearing, radial stiffness will increase, thereby augmenting the radial stiffness provided by the stand alone magnetic bearing, yielding a significant increase over the radial stiffness provided by a magnetic bearing/conventional pivot configuration. While the hydrodynamic bearing only adds radial stiffness upon operation (spin up), the combination of the hydrodynamic bearing and the magnetic bearing offers other benefits including dampening for non-operational shock attenuation as provided by the fluid reservoir system. As such the combination offers a novel solution particularly well suited to use in a disc drive bearing system.

The magnetic bearing/hydrodynamic bearing pair also minimizes the motor start torque requirements of the spindle motor assembly 110. It is well known in the art, that after a hydrodynamic bearing comes to rest, contact often occurs between the hub shaft 116 and the side walls of the stator well 154. This is due to the lack of pressure in the hydrodynamic bearing which allows the fluid (or air) in the bearing to recede controlled by the laws of gravity. As such, upon start up, the hydrodynamic bearing requires a large motor torque to break free the metal to metal contact developed as the hub shaft comes to rest against the stator well side walls. The novel combination of the hydrodynamic bearing used as an axial pivot in conjunction with the magnetic bearing eliminates this motor start torque problem. Due to the attraction mode orientation of the complementarily aligned poles, upon coming to rest, the bearing system of the present invention would maintain the hub shaft 116 centrally disposed in the stator well 154, thereby eliminating any friction contact at start up. This alignment capability is unique to the magnetic bearings of the present invention.

Figure 6:
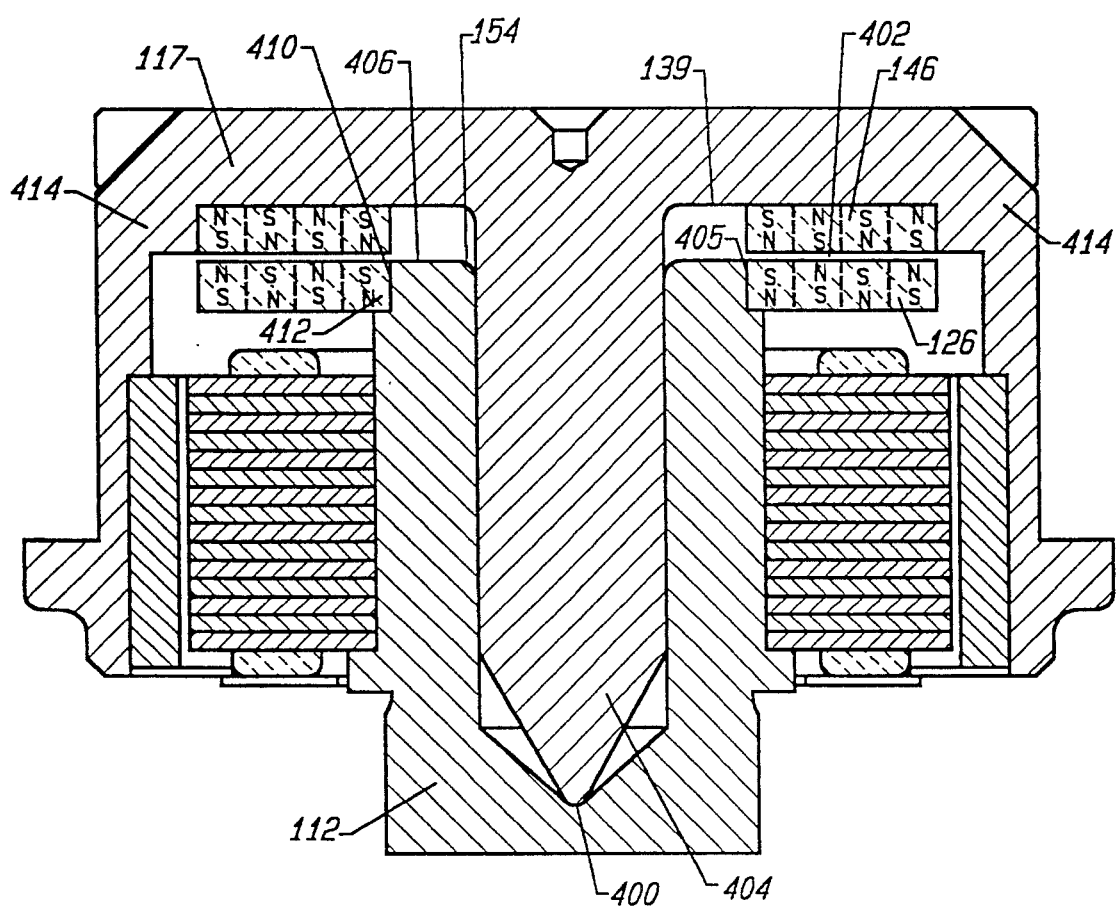
FIG. 6 is a cut away view of a disc drive incorporating an alternative embodiment of the present invention for use in a motor having a pivot located at the bottom of the motor, while the magnetic bearing is located at the top.

Referring next to FIG. 6, an alternative embodiment of the invention will be described using like numbers for like parts. In this embodiment, a four pole magnetic bearing in attraction mode is provided for use in a motor having a pivot 400 located at the bottom of the motor, while the magnetic bearing 402 is located at the top. In this embodiment, a four pole magnet configuration was selected to maximize the axial stiffness provided by the magnetic bearing. The reduced radial stiffness provided by the four pole configuration can be compensated for by the use of a hydrodynamic bearing 152 in conjunction with the longer hub shaft 404. In this configuration more surface area is available for use in the hydrodynamic bearing 152, thereby creating a more radially stable bearing system. Additionally, a longer hub shaft 404 will provide for better stability and tilt performance as the hub responds with a pendulum effect to axial shocks, a marked improvement over a short pivot configuration.

The magnetic bearing 402 is comprised of a bottom annular disc 126 attached to the stator 112 and a top annular disc 146 attached to the rotor 117. The bottom annular disc 126 is fixedly attached and journaled about the stator 112 via an aperture 134 in the disc 126. The stator 112 includes a top portion 406 configured for receiving the hub shaft 404 at the stator well 154. The top portion 406 includes a ledge 410 fashioned along the edge of the top portion whose inside diameter matches the inside diameter of the aperture 134 of the bottom annular disc 126. In this way, the stator 112 is capable of receiving the bottom annular disc 126 by allowing the aperture 134 to pass over the top portion, and thereafter support the bottom annular disc as the disc comes in contact with the support base 412 forming the bottom of the ledge 410. In this embodiment, no spacer region is provided between the annular disc 126 and the stator 112, however one may be added as required to align the poles of the magnetic bearing assembly. Additionally, a magnetic permeable spacer region may be provided to act as a flux return thereby increasing the efficiency of the magnetic bearing. The annular disc 126 is comprised of a plurality of axially aligned poles 130 which lie above the stator winding assembly 120 of the rotating shaft motor. The poles are aligned such that the first pole 405 closest to the stator 112 is oriented with a north pole facing the support base 412 of the stator 112. The polarity of the remaining poles of the multi-pole annular disc 126 alternates with respect to the axial orientation of the first pole as the disc extends away from the stator 112 such that every other pole is aligned with the same north-south orientation with respect to the stator 112.

Superimposed over the bottom annular disc 126 is the top annular disc 146 including a like plurality of axially aligned poles 148 which are aligned in attraction mode with respect to a corresponding pole on the bottom annular disc 126. The top annular disc 146 is fixedly attached to the underside of the rotor 117 on the interior face 139 by an adhesive. In this embodiment, an epoxy model "642" manufactured by Loctite Corp. was selected to bond the top annular disc 146 to the surface of the rotor 117. Those ordinarily skilled in the art will recognize that the top annular disc 146 may be attached by any of a variety of methods including welding, or other means for bonding. The selection of the Loctite epoxy "642", should in no way be construed as limiting, rather illustrative of the various methods available for bonding. In this embodiment, the interior face 139 of the rotor 117 includes a support flange 414 located at the junction of the interior face 139 and the interior wall 142 extending about the entire circumference of the interior of the rotor 117. The support flange 414 provides radially support for the top annular disc 146 as the rotor 117 rotates about the pivot 400. While in this embodiment the support flange is to be constructed from a non-magnetic material, a magnetic permeable material may be provided to act as a flux return thereby increasing the efficiency of the magnetic bearing The top annular disc 146 includes an aperture 137 which allows the annular disc to be mounted to the interior face 139 of the rotor 117 allowing that the hub shaft 404 to pass through the aperture 137 extending into the stator well 408 forming a junction with the stator 112 at the pivot 400. The aperture must at least allow for the hub shaft to pass, but may be larger depending on the configuration of the magnets in the magnetic bearing 402. In this embodiment a gap of 0.25 mm is maintained between the annular discs so as to maintain stability of the bearing assembly.

While the alternative embodiment provides the benefit of the longer hub shaft 404, a limitation exists as to the placement of the pivot relative to the magnetic bearing. Due to the attractive forces between the spindle magnet 144 and the steel located in the stator assembly 120, radial stiffness of the magnetic bearing depends on the hub shaft pivot location (vertical). A pivot located as in the first embodiment well above the magnetic bearing provides suitable radial stiffness, as does the bottom pivot of the alternative embodiment. However, as the pivot location moves between these two points a region of instability exists. In this unstable region a tilt problem arises, resulting in reduced radial stiffness of the magnetic bearing. Radial stiffness of the magnetic bearing increases as the vertical distance between the pivot location and the magnetic bearing increases. As such a minimum of 0.1 mm of vertical spacing (absolute value) must exist in order to provide sufficient radial stiffness in these applications.

Figure 7:
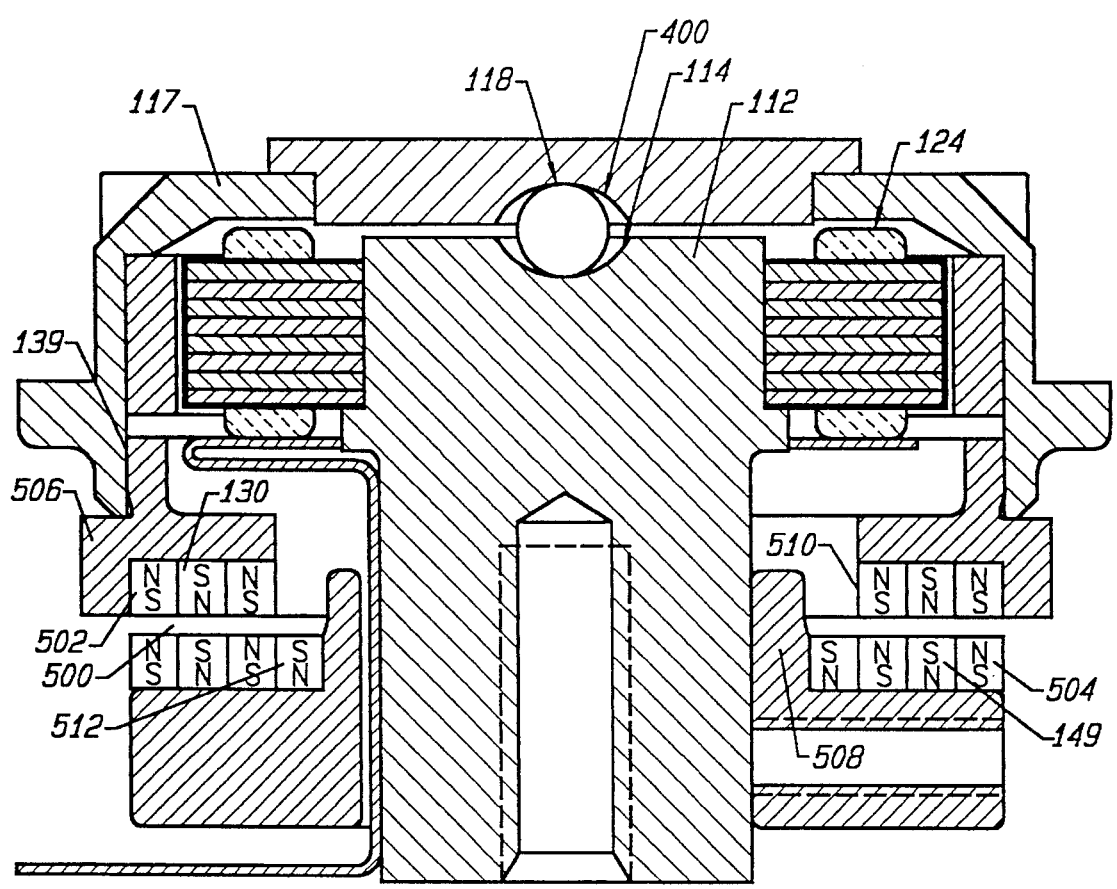
FIG. 7 is a cut away view of a disc drive incorporating a third embodiment of the present invention including a magnet bearing in attraction mode with an unbalanced number of poles on the rotor and stator assemblies.

Referring next to FIG. 7, a third embodiment of the present invention will be described using like numbers to describe like parts. In this embodiment, a spindle motor similar to the first embodiment is provided including a magnetic bearing 500 on top of the motor with a top pivot 400. The magnetic bearing 500 comprises a top multi-pole annular ring 502 disposed over a bottom multi-pole annular ring 504 in which the poles are in attraction mode with like poles aligned.

A stator 112 includes a top annular ring 502 fixedly attached to the interior face of the rotor 139 by means of a support bracket 506. The top annular ring extends out radially from the interior face 139 of the rotor 117 perpendicularly toward the stator 112. The top annular ring 502 is comprised of a plurality of axially aligned poles 130. In this embodiment three poles 130 are utilized with the polarity of the first and third poles having a similar north-south pole orientation, while the second is of opposite orientation to poles one and three. No spacer element is included allowing for the direct coupling of the annular ring magnets 502 to the rotor 117 via the support bracket 506. While in this embodiment the support bracket is to be constructed from a non-magnetic material, a magnetic permeable material may be provided to act as a flux return thereby increasing the efficiency of the magnetic bearing.

Referring still to FIG. 7, stator 112 includes a bottom annular ring 504 fixedly attached to the stator 112 by means of a stator support bracket 508. While in this embodiment the support bracket is to be constructed from a non-magnetic material, a magnetic permeable material may be provided to act as a flux return thereby increasing the efficiency of the magnetic bearing. The bottom annular ring extends out radially from the exterior wall of the stator 112, perpendicular to and extending toward to the interior face 139 of the rotor 117. A small gap is formed between the top surface of the bottom annular ring 504 and the bottom of the top annular ring 502, and also between the stator 112 and the end 510 of the top annular ring 502. In this embodiment, the gap between the top and bottom annular rings is 0.25 mm, while the gap between the end 510 and the stator 112 is 2.25 mm. This configuration allows for the free rotation of the rotor 117 about the stator 112 via the axial pivot 400.

The bottom annular ring 502 is comprised of a plurality of axially aligned poles 149. In this embodiment four poles 149 are utilized with the polarity of the first and third poles having a similar north-south pole orientation, while the second and fourth poles are similarly oriented but of opposite orientation to poles one and three. The top and bottom annular rings are configured so as to align poles top and bottom so that each pole is in exact alignment over its complementary pole in the other annular ring. In this embodiment, an un-paired pole 512 is included in the bottom annular magnet ring 504. The un-paired pole 512 acts to add stability end radial stiffness to the magnetic bearing, by providing an adjacent pole which is in repulsion with respect to the next closest complementary adjacent pole in the top annular ring 502. Those ordinarily skilled in the art will recognize that the flux lines generated by the un-paired pole configuration of the present invention act to augment the attractive forces between complementary pole pairs, thereby resulting in a bearing system that is more resilient to shocks along the radial axis. In this embodiment, no spacer element is included allowing for the direct coupling of the annular ring magnets 502 to the rotor 117.

Figure 8:
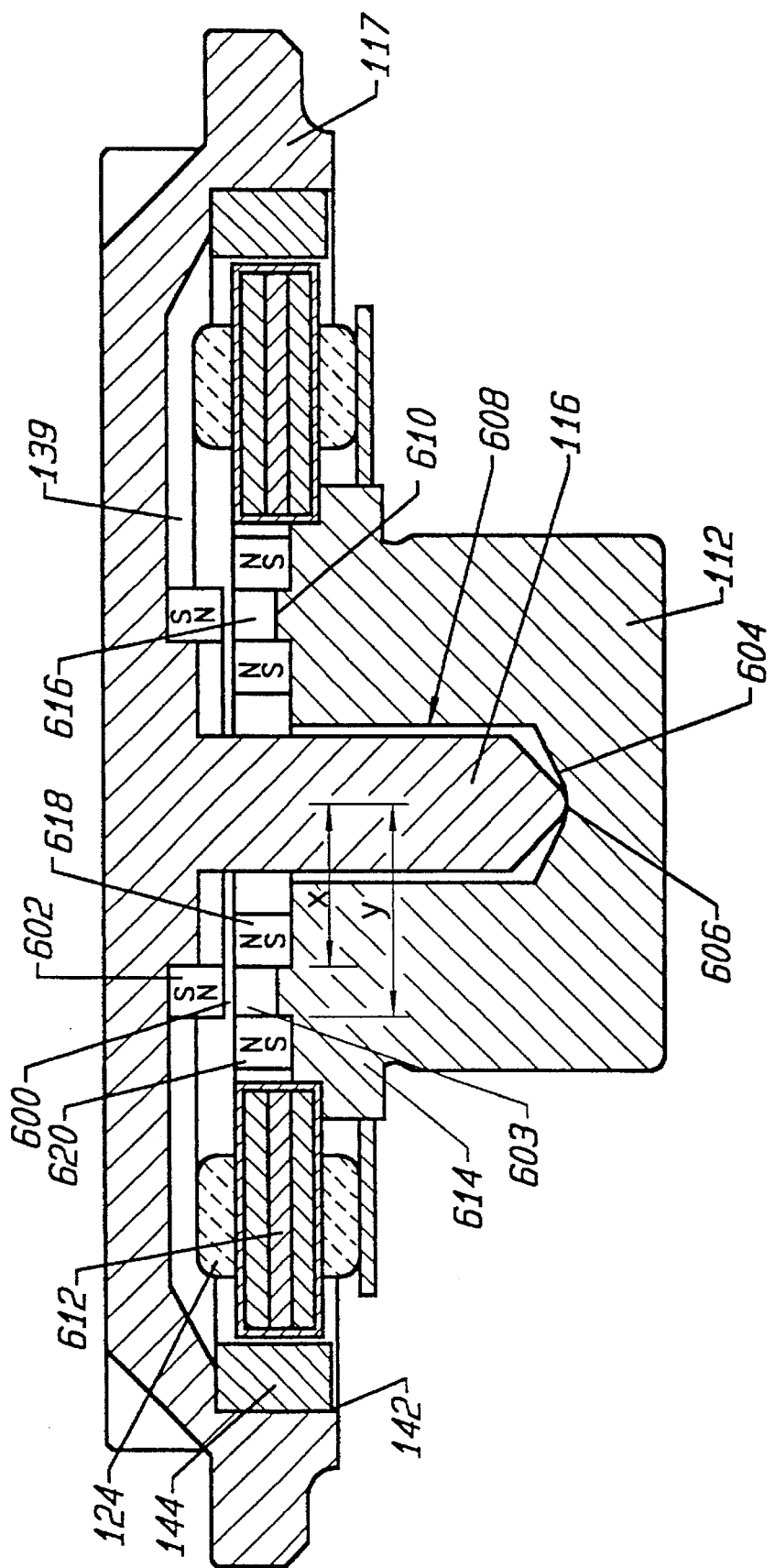
FIG. 8 is a cut away view of a disc drive incorporating a fourth embodiment of the present invention including top mounted magnetic bearing in repulsion mode with complete offset.

Referring next to FIG. 8, a fourth embodiment of the present invention will be described using like numbers to describe like parts. In this embodiment, a magnetic bearing 600 is disposed between a stator 112 and rotor 117 in a disc drive spindle motor assembly 110. The rotor 117 is substantially drum shaped and includes an interior face 139, a centrally disposed hub shaft 116 and interior wall 142 for mounting a spindle magnet 144. A single annular disc 602 is disposed on the interior face 139 journaled about the hub shaft 116. The annular disc 602 is comprised of a single axially aligned magnet formed in a ring structure. The hub shaft 116 is disposed in the stator well 604 extending to a pivot point 606 on the stator 112 so as to allow the rotor to freely rotate about the stator during operation of the disc drive. In this embodiment a hydrodynamic bearing 608 is utilized, but a ruby ball bearing, dynamic ball bearing or other radial bearing may be substituted as is known in the art.

The stator 112 includes a stator base 610 with attached stator assembly 612. The stator assembly 612 includes coil windings 124 which are alternatively energized to cause movement of the rotor 117 about the stator 112. The stator base 610 includes a top portion 614 having second 618 and third 620 annular magnetic discs disposed thereon. While in this embodiment the stator base 610 is to be constructed from a non-magnetic material, a magnetic permeable material may be provided to act as a flux return thereby increasing the efficiency of the magnetic bearing. The second annular disc 618 is complementarily located on the top portion of the stator 614 offset such that the outermost side (with respect to the hub shaft 116) of the second annular disc 618 is aligned with the innermost side of the opposing first annular disc 602 which is located on the rotor 117. The second annular disc 618 comprises an axially aligned magnetic pole configured in a substantially ring shape which lies in repulsion mode as to the first annular disc pole which is mounted to the rotor 117. In this embodiment the dimensions of the second annular disc are 5 mm in diameter, 1.0 mm in thickness and 1.0 mm in width.

A third a middle annular disc 620 is attached to the top portion 614 of the stator 112 to the outside of and journaled about the second annular disc 618. In the preferred embodiment, the two discs are separated by a non-magnetic spacer region 603 of like thickness which lies directly opposed to the first annular disc 602 disposed on the rotor 117. While in this embodiment the spacer region is to be constructed from a non-magnetic material, a magnetic permeable material may be provided to act as a flux return thereby increasing the efficiency of the magnetic bearing. The third annular disc 620 comprises an axially aligned magnetic pole configured in a substantially ring shape which lies in repulsion mode as to the first annular disc pole which is mounted to the rotor 117. Preferably the gap 603 which extends from the outer radius of the first magnetic annular disc 618 to the inner radius Y of the third annular disc 620 so that the first annular disc 602 supported from the rotor will substantially overlie this gap to optimize the stabilization forces created by this magnetic bearing. In this embodiment the dimensions of the third annular disc 620 are 9 mm in diameter, 1.0 mm in thickness and 1.0 mm in width so as to lie flush with raised second annular disc 618 while leaving a gap of 0.5 mm between the third annular disc 620 and the stator assembly 612.

Figure 9:
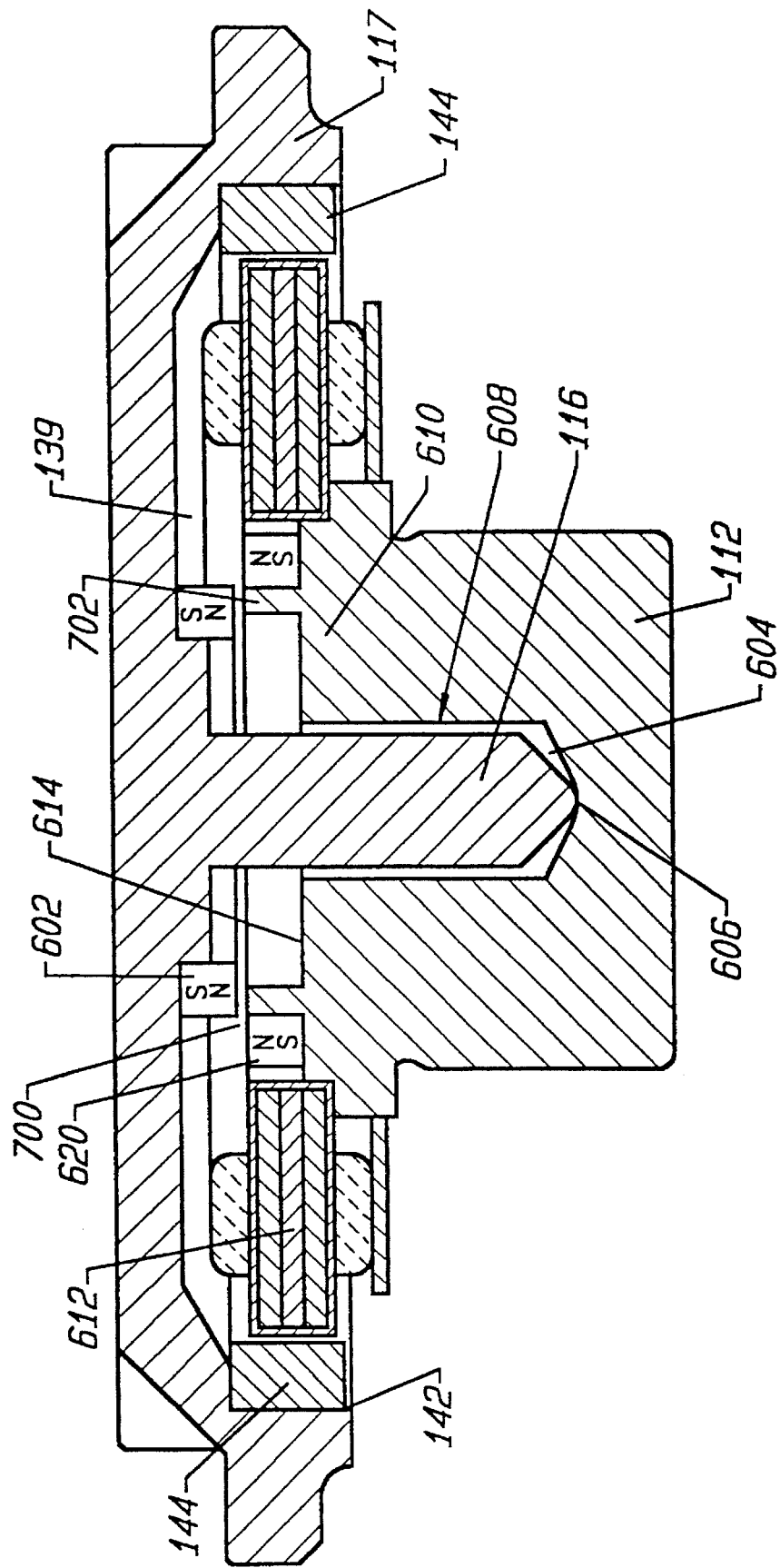
FIG. 9 is a cut away view of a disc drive incorporating a fifth embodiment of the present invention including top mounted magnetic bearing in repulsion mode with complete offset and steel flux path.

Referring next to FIG. 9, a fifth embodiment of the present invention will be described using like numbers to describe like parts. In this embodiment, a magnetic bearing 700 is disposed between a stator 112 and rotor 117 in a disc drive spindle motor assembly 110. The rotor 117 is substantially drum shaped and includes an interior face 139, a centrally disposed hub shaft 116 and interior wall 142 for mounting a spindle magnet 144. A single annular disc 602 is disposed on the interior face 139 journaled about the hub shaft 116. The annular disc 602 is comprised of a single axially aligned magnet formed in a ring structure. The hub shaft 116 is disposed in the stator well 604 extending to a pivot point 606 on the stator 112 so as to allow the rotor to freely rotate about the stator during operation of the disc drive. In this embodiment a hydrodynamic bearing 608 is utilized, but a ruby ball bearing, dynamic ball bearing or other radial bearing may be substituted as is known in the art.

The stator 112 includes a stator base 610 with attached stator assembly 612. The stator assembly 612 includes a plurality permanent magnets 122 and coil windings 124 which are alternatively energized to cause movement of the rotor 117 about the stator 112. The stator base 610 includes a top portion 614 with magnetic steel annular ring 702 which has dimensions of 7 mm in diameter, 1.0 mm in thickness and 0.5 mm in width. The steel annular ring 702 is complementarily located on the top portion of the stator 614 opposing the first annular disc 602 which is located on the rotor 117. An annular disc 620 is attached to the top portion 614 of the stator 112 to the outside of and journaled about the steel annular ring 702. The annular disc 620 comprises an axially aligned magnetic pole configured in a substantially ring shape which lies in repulsion mode as to the first annular disc pole which is mounted to the rotor 117. In this embodiment the dimensions of the annular disc 620 are 9 mm in diameter, 1.0 mm in thickness and 1.0 mm in width so as to lie flush with steel annular disc 702 while leaving a gap of 0.25 mm between the annular disc 620 and the stator assembly 612.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. Specifically, reference has been made to magnetic bearing systems (including hydrodynamic bearings) for use in axial pivots. Those ordinarily skilled in the art will recognize that the description is equally suited to radial pivot applications, orientation merely an engineering choice without import to the considerations disclosed herein.

What is claimed is:

1. In a disc drive, an apparatus for journaling a rotor about a stator of a spindle motor comprising:

a pivot, said pivot for pivotally displacing said rotor about said stator;

an inner annular disc having outer radius X, said inner annular disc comprising an axially aligned magnetic pole, said inner disc fixably attached to a top portion of said stator;

an outer annular disc having an inner radius greater than X, said outer annular disc comprising an axially aligned magnetic pole having a magnetic pole orientation similar to said magnetic pole of said inner annular disc, said outer annular disc fixably attached to said top portion of said stator at a radial distance from said first annular disc whereby a first radial gap is formed between said inner and said outer annular discs; and a middle annular disc, said middle annular disc comprising an axially aligned magnet pole axially magnetically oriented similarly to said pole of said inner annular disc, said middle disc fixably attached to said rotor and centrally disposed so as to oppose said first gap.

2. The apparatus of claim 1 wherein said first gap has a central radius equal to a central radius of said middle annular disc.

3. A spindle motor for use in a disc drive comprising a hub carrying a rotor magnet on its inner circumference and adapted to mount a disc on its outer circumference, a base supporting a stator radially aligned with the rotor magnet to cause rotation of said hub, a first inner magnetic pole and a second outer magnetic pole supported on said base and radially separated by a gap, said first and second magnetic poles having a common magnetic orientation in an axial direction, a third magnetic pole supported on said hub centered over said gap between said first and second magnetic poles, and magnetically axially oriented to oppose said first and second magnets.

4. A spindle motor as claimed in claim 3 wherein each of said magnetic poles is substantially disc shaped.

5. A spindle motor as claimed in claim 4 wherein each of said magnetic poles is continuous and disc-shaped.

6. A spindle motor as claimed in claim 3 wherein said hub is substantially drum shaped including a radial portion extending from a center of rotation of said hub over said stator, said hub supporting said rotor magnet on a substantially axial surface adapted to mount a magnetic disc on its outer circumference, said hub supporting said third magnetic pole on said radial portion to stabilize said rotor over said stator.

7. A spindle motor as claimed in claim 6 wherein said first and second magnetic poles are supported from said base, radially aligned with said stator of said motor.

8. A spindle motor as claimed in claim 6 wherein said stator is constructed of non-magnetic material.

9. A spindle motor as claimed in claim 7 wherein said stator region supporting said first and second magnets is formed of magnetic material to function as a flux return for said magnets.

10. A spindle motor as claimed in claim 4 wherein said third magnetic pole is radially located relative to radially distal one of said first and third magnets so that said third magnet's radially outermost side is aligned with an innermost side of said radially distal magnet.

11. A spindle motor as claimed in claim 6 including a non-magnetic spacer in said gap between said first and second magnetic poles.

\* \* \* \* \*